Aug. 20, 1935.  K. F. ALDRIDGE  2,011,990
PLANT SUPPORT
Filed July 6, 1932
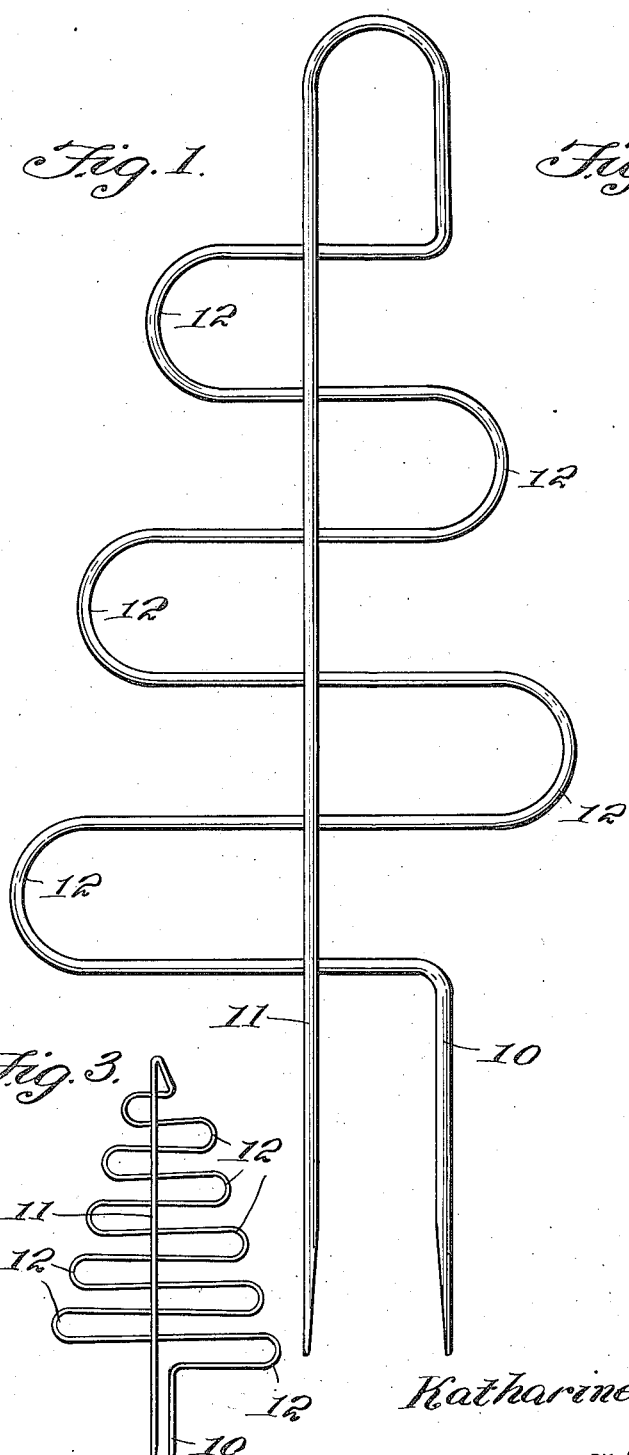
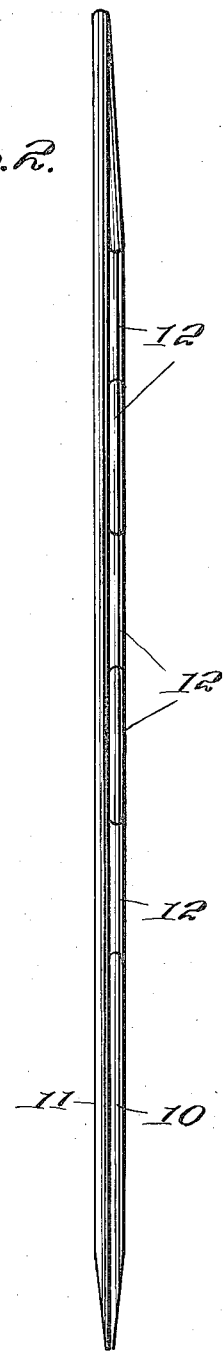
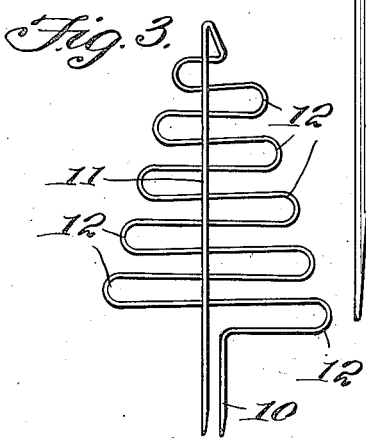

Patented Aug. 20, 1935

2,011,990

UNITED STATES PATENT OFFICE 2,011,990

PLANT SUPPORT

Katharine F. Aldridge, Leland, Miss.

Application July 6, 1932, Serial No. 621,079½

3 Claims. (Cl. 47—47)

The present invention contemplates the provision of a plant support, which is very simple in construction, and with which the vines or stalks of plants to be supported can be very conveniently associated.

In carrying out the invention, I construct the support from a single strand of wire, formed to provide a pair of limbs capable of being partly driven into the ground, with one of said limbs characterized by a plurality of spaced superimposed loops through which the vines or stalks of plants can be passed for the purpose intended.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a view in elevation.

Figure 2 is a view taken at a right angle to Figure 1.

Figure 3 is a view showing how the support can be formed with any number of loops.

The support constituting the subject matter of the present invention is preferably formed from a single strand of wire bent upon itself to provide a pair of limbs 10 and 11 respectively. The limb 10 is further bent to provide a plurality of superimposed horizontally arranged loops 12 which gradually diminish in length from the lowermost to the uppermost loop as shown. Of course, the support can vary in size and have as many of such loops as desired without departing from the inventive idea, and as illustrated in Figure 3. These loops are arranged at one side of the limb 11 in contact therewith, and when the support is partly driven into the ground, the vines or stalks of the plants to be supported are passed through the loops as will be readily understood. The limb 10 beneath the lowermost loop extends parallel with the limb 11, while the free ends of both of said limbs are tapered and pointed to permit the support to be easily forced into the ground or surface.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A plant support of the character described formed from a single length of wire and including a pair of limbs, the free ends of said limbs being tapered and pointed and adapted to be driven into the ground, and a plurality of superimposed loops formed by one of said limbs and extending across the other limb in contact therewith, and said loops gradually diminishing in size in successive order.

2. A plant support of the character described including a pair of limbs, the free ends of said limbs being pointed and adapted to be driven into the ground, and a plurality of superimposed loops formed by one of said limbs and extending across the other limb in contact therewith.

3. A plant support of the character described formed from a single length of wire and including a pair of limbs, one of said limbs being straight throughout its entire length, the free ends of said limbs being adapted to be driven into the ground, and a plurality of superimposed loops formed by the other of said limbs between the ends thereof and arranged horizontally across the first mentioned limb in contact therewith.

KATHARINE F. ALDRIDGE.